Oct. 17, 1967  J. H. BERTIN ET AL  3,347,170
GUIDING AND SUPPORTING TRACK FOR VEHICLES
SUPPORTED BY FLUID CUSHIONS
Filed March 3, 1965
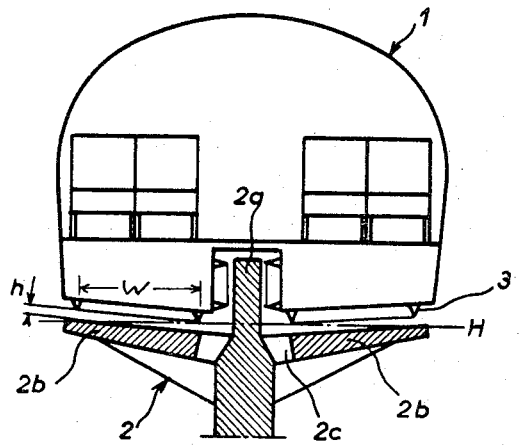
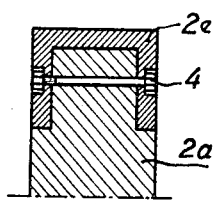
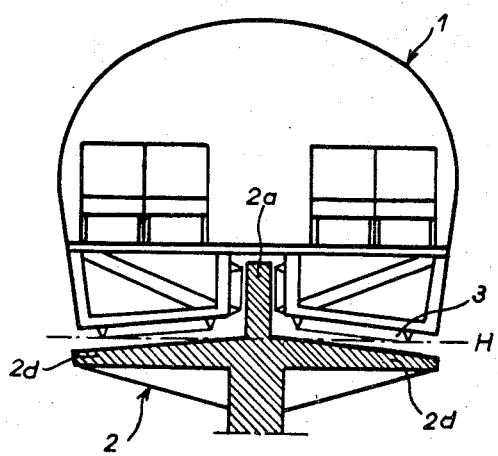
Inventors
Jean Henri Bertin
Paul François Guienne
By Stevens, Davis, Miller & Mosher
Attorneys

United States Patent Office 3,347,170
Patented Oct. 17, 1967

3,347,170
GUIDING AND SUPPORTING TRACK FOR VEHICLES SUPPORTED BY FLUID CUSHIONS
Jean Henri Bertin, Neuilly-sur-Seine, and Paul Francois Guienne, Paris, France, assignors, by mesne assignments, to Societe d'Etudes de l'Aerotrain, Plaisir (Seine-et-Oise), France, a corporation of France
Filed Mar. 3, 1965, Ser. No. 436,786
Claims priority, application France, Mar. 5, 1964, 966,287
3 Claims. (Cl. 104—120)

ABSTRACT OF THE DISCLOSURE

A track for supporting and guiding a ground effect vehicle, having a cross section in the general shape of an inverted T with a central upright portion and two lateral wing portions extending sideways from the base of said upright portion, said wing portions having a slanting upper surface inclined at a small angle to the horizontal.

---

The present application is a continuation-in-part of application, Ser. No. 288,386, filed June 17, 1963, now Patent No. 3,190,235, the aforementioned application 288,386, benefiting from a prior foreign filing data of June 26, 1962.

This invention relates to tracks on which travel vehicles supported and guided to fluid cushions and which have substantially horizontal supporting surfaces and substantially vertical, oppositely orientated, guiding surfaces.

It is the object of the present invention to facilitate the natural drainage of rain along the supporting surfaces of the track and the clearing of any objects which may fall onto those surfaces, especially the clearing effect resulting from the passage of vehicles along the track.

The invention also has for its object to facilitate track switching operations and also possible turnabouts by the vehicles at the end of the line, by allowing the vehicles to travel, at least temporarily, at relatively low speed, along strictly flat and substantially horizontal marshaling surfaces, and not merely along the normal tracks.

The invention consists chiefly in imparting to the substantially horizontal supporting surfaces of the track a transverse slope equal at the most to the quotient of the normal leakage height of an operative fluid cushion divided by the width of that cushion. In cases where the lowermost portion of said supporting surfaces is adjacent the central rail, passages are provided in that portion for discharging all extraneous matter.

In the drawings:

FIGURE 1 shows in cross-section a vehicle and a track according to the invention, and indicates a specific value for the transverse slope on the substantially horizontal supporting surfaces of the track;

FIGURE 2 shows in corresponding fashion an alternative embodiment of the track; and FIGURE 3 shows in detail yet another possible embodiment of the track of FIGURE 2.

Referring first to FIGURE 1, there is shown thereon in cross-section a vehicle 1 associated to a guide track 2, made of concrete for example, comprising a vertical axial rail $2a$ and two substantially horizontal flanges $2b$. Through the medium of multiple air cushions bounded by deformable peripheral seals 3, the vehicle 1 bears alike against the lateral faces of the vertical rail $2a$ and against the supporting surfaces of the flanges $2b$.

These surfaces are slightly inclined in order to enable rainwater to drain off them naturally and to facilitate cleaning of the track, the water and any foreign matter tending to drain or roll towards the axial rail, along which are provided multiple passages $2c$ to enable this matter to be evacuated. The transverse slope S of said supporting surfaces according to the invention is at the most equal to the quotient of the normal leakage height $h$ of an operative supporting cushion divided by the width $w$ of that cushion. As a result, all the supporting cushions can function in combination with a strictly flat and substantially horizontal surface such as that shown by the dot-dash line H.

FIGURE 2 shows an alternative constructional form for such a track, in accordance with which the substantially horizontal supporting surfaces of the flanges $2d$ are inclined downwardly with the same upper limit for the transverse gradient, but in this case out towards the edges of the track instead of towards the axial rail.

In this constructional form and in that of FIGURE 1, switches or changes of track, as well as vehicle turnabouts at the end of a track, can easily be effected when the central rail $2a$ is suppressed. For instance, such turnabouts can be carried out at slow speed on a flat maneuvering surface of relatively small size, the vehicle being continuously sustained by its supporting air cushions.

FIGURE 3 shows an alternative embodiment, in which the upper part of the guide rail is topped by a U-shaped capping $2e$ which cooperates with skids carried by the vehicle for braking purposes and for evacuating almost all the heat produced by the braking.

This capping can be made of sheet-metal, steelplate being an example, and be secured to the rail $2a$ by bolts 4. This capping reinforces and protects the central rail at the same time.

It would also be possible to insert metallic elements into the horizontal or vertical portions of the track whereby to permit propulsion of the vehicle by means of a linear-induction type motor.

What is claimed is:
1. A transport system by tracked ground effect vehicle comprising in combination:
   a track which is in cross section in the general shape of an inverted T with an upwardly projecting central upright portion comprising two outwardly facing, substantially vertical side surfaces and two lateral wing portions extending sideways from the foot of said central upright portion and comprising each an upwardly facing, generally planar surface having a slant S with respect to the horizontal, and,
   a vehicle which comprises inwardly opposite guiding means bearing against said outwardly facing side surfaces, for guiding said vehicle by reaction force thereon, and downwardly projecting seals designed to peripherally bound fluid cushions for bearing said vehicle on both said upwardly facing, slanting surfaces and ending with lower free edges extending in planes generally parallel to and adjacent said slanting surfaces, said fluid cushions being in part defined by a mean leakage gap height $h$ measured between said lower free edges and said slanting surfaces and by a geometric width $w$ measured between points of said free edges which are opposite to each other transversely with respect to the direction of motion of the vehicle, the said slant S, the said height $h$ and the said width $w$ being interrelated by the relation $$S \leq h/w$$

2. Transport system as claimed in claim 1, wherein said inwardly opposite guiding means on the vehicle comprise fluid cushions formed against said outwardly facing side surfaces of said central upright portion of the track.

3. Transport system as claimed in claim 2, wherein said inwardly opposite guiding means on the vehicle comprise inwardly projecting seals designed to bound peripherally the corresponding fluid cushions and ending with free edges extending in planes generally parallel to and adjacent said outwardly facing side surfaces.

References Cited

UNITED STATES PATENTS

| | | | |
|---|---|---|---|
| 3,096,728 | 7/1963 | Amann et al. | 104—134 |
| 3,164,103 | 1/1965 | Lathers et al. | 104—134 |
| 3,174,440 | 3/1965 | Cockerell | 104—120 |
| 3,233,559 | 2/1966 | Smith et al. | 105—1 |

ARTHUR L. LA POINT, *Primary Examiner.*

J. E. BABER, *Assistant Examiner.*